United States Patent Office 3,137,715
Patented June 16, 1964

---

3,137,715
1-(α-ACYLALKYL)-π-ALLYLCOBALT COMPLEXES AND THEIR PREPARATION
Richard F. Heck, Wilmington, Del., assignor to Hercules Powder Company, Wilmington, Del., a corporation of Delaware
No Drawing. Filed Jan. 26, 1962, Ser. No. 169,140
14 Claims. (Cl. 260—439)

This invention relates to a process of preparing acyldienes and to the intermediate organocobalt complexes used in their preparation and, more particularly, to the reaction of a conjugated diene with an alkyl- or acyl-cobalt carbonyl whereby there is obtained a 1-(α-acylalkyl)-π-allylcobalt carbonyl as an intermediate which, on reaction with a base, yields the acyldiene.

Acyldienes have in the past been prepared only with great difficulty; and, hence, these valuable reactive compounds have not generally been available, and, in fact, only specific acyldienes have been possible. Thus, 1,3-hexadiene-5-one has been prepared by reacting ethinylbutadiene with water in the presence of sulfuric acid and mercury sulfate. Acetone and crotonaldehyde have been reacted to produce 2,4-heptadiene-6-one, but the yields were very low and the product was difficult to purify. These procedures are not only of limited practicality, but produce only the specific products named and may not be applied to the production of acyldienes generally.

Now in accordance with this invention it has been found that acyldienes generally may be prepared by the reaction of a conjugated diene having at least one hydrogen atom on a terminal carbon of the diene group with an organocobalt carbonyl. The reaction that takes place may be expressed by the following series of reactions:

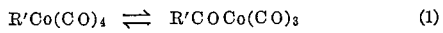
(1)

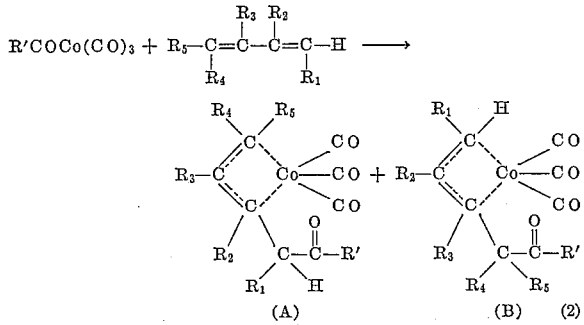
(2)

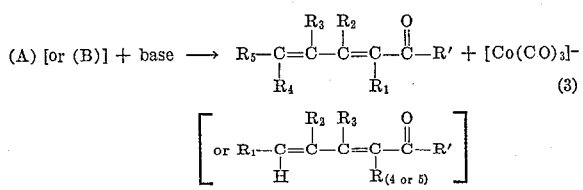
(3)

where $R_1$, $R_2$, $R_3$, $R_4$, and $R_5$ can each be hydrogen, alkyl, cycolalkyl, aryl, aralkyl, alkoxy, halo, carboalkoxyalkyl, alkenyl, or cycloalkenyl and may be alike or different, or two of them together may form an alicyclic ring, and R' is an organo radical. These same designations are also used in the equations set forth below. It should be noted that in Equation 3, if in Formula B, at least one of $R_4$ and $R_5$ is not hydrogen, this B isomer will not produce an acyldiene and only the A isomer will yield the acyldiene. If either $R_4$ or $R_5$ or both are hydrogen, both of the isomers A and B will yield the desired acyldiene.

Instead of first synthesizing the organocobalt carbonyl as a separate step as, for example, from an organo halide and sodium cobalt tetracarbonyl according to the following reaction:

(4)

the organocobalt carbonyl can be formed in situ, in which case the reaction that takes place in forming the π-allylcobalt tricarbonyl intermediates may be expressed as

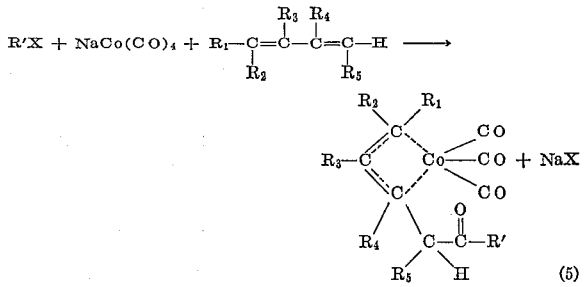
(5)

The acyldiene may also be prepared in one step by carrying out Reaction 5 in the presence of a base, whereupon the following reaction takes place:

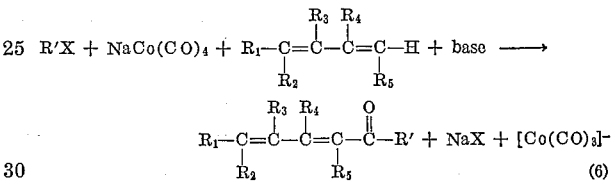
(6)

In preparing the acyldienes in a single step reaction as set forth in (6), the reaction may be carried out catalytically with respect to the salt of cobalt hydrocarbonyl employed by carrying out the process in the presence of carbon monoxide so that the cobalt tetracrabonyl ion is regenerated according to the following reaction and is then reused in the process:

(7)

By so operating, it is possible to produce many moles of acyldiene per mole of cobalt hydrocarbonyl salt used. In this case, i.e. in the presence of carbon monoxide, some of the alkyl- or aryl-cobalt tetracarbonyl may react with the carbon monoxide to form an acyl-cobalt tetracarbonyl as a side reaction as follows:

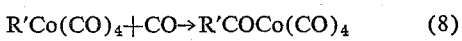
(8)

However, since the equilibrium set forth below is established, the acyl-cobalt tricarbonyl is formed for reaction as set forth in Equation 2:

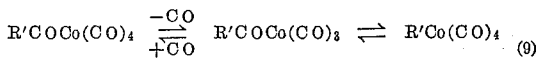
(9)

In place of the sodium cobalt tetracarbonyl used in the foregoing reactions to prepare the organocobalt carbonyl, there may be used any alkali metal salt, ammonium salt or quaternary ammonium salt, or in alkaline earth metal salt such as the magnesium or calcium salt. Instead of using a salt of cobalt hydrocarbonyl, there may be used cobalt octacarbonyl as the source of the cobalt tetracarbonyl ion. It is believed that cobalt octacarbonyl disproportionates in the reaction mixture into cobalt tetracarbonyl anion as follows:

The new 1(α-acylalkyl)-π-allylcobalt tricarbonyl intermediates formed in accordance with Equation 2 or 5 may be isolated as such, by distillation of the reaction diluent or in some cases by distillation of the complex per se, or they may be isolated in the form of their monotriphenylphosphine derivatives, which are usually higher melting and more stable than the tricarbonyl complex per se. These phosphine derivatives are easily prepared by adding triphenylphosphine to a solution of the tricarbonyl complex at about 0° C. to about 50° C. and evaporating the solvent. This reaction may be expressed as follows:

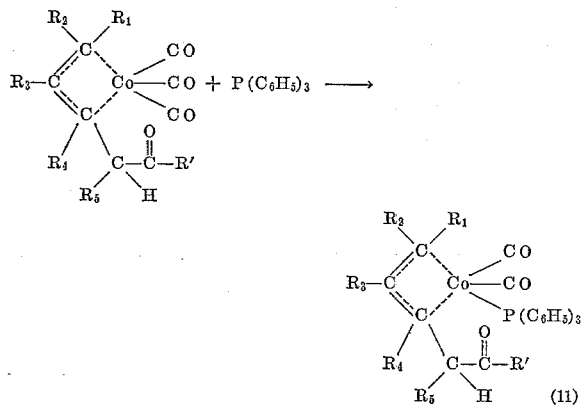

The following examples will illustrate the preparation of the new 1-(α-acylalkyl)-π-allyl-cobalt tricarbonyls and the preparation of acyldienes from them. All parts and percentages are by weight unless otherwise indicated.

EXAMPLES 1–8

These examples illustrate the preparation of 1-(α-acyl-alkyl)-π-allylcobalt tricarbonyl complexes from various dienes and the isolation thereof in the form of their triphenylphosphine derivatives. Example 1 is typical of the reactions carried out in these examples.

*Example 1.*—In a nitrogen-filled closed reaction vessel were placed 45 ml. of 0.07 M sodium cobalt tetracarbonyl in ether solution, 6.0 ml. of liquid butadiene and 3.0 ml. of methyl iodide. After stirring for 45 minutes at room temperature the reaction was complete as judged by the disappearance of the 5.3μ absorption band of sodium cobalt tetracarbonyl in the infrared spectrum. Evaporation of the solution at 0° left a yellow residue which was extracted with 45 ml. of ether in order to dissolve the complex and separate it from the sodium iodide formed in the reaction. To 15 ml. of the ether solution was added at 0° in a reaction vessel fitted with a gas buret, 15 ml. of 0.2 M potassium triiodide in water solution. The solution evolved 99 ml. of gas or 3.05 mmoles. Since 1.05 mmoles of the cobalt complex were present, there were 3 carbon monoxide groups attached to each cobalt atom. The cobalt complex can be isolated by high vacuum distillation as a low melting, crystalline solid. However, the complex is easily converted into a more stable derivative by reacting it with one equivalent of triphenylphosphine in ether solution. Addition of pentane to the solution caused the complex to crystallize out. Several recrystallizations from a mixture of tetrahydrofuran and pentane gave orange crystals, M.P. 87–91° with decomposition. Analysis for carbon and hydrogen gave 65.48% carbon and 5.25% hydrogen. The theoretical values for $C_{26}H_{24}O_3PCo$ are 65.83% carbon and 5.10% hydrogen.

Examples 2–8 were carried out by the same general procedure. In Table I below are set forth the diene and organo halide reacted, the 1-(acylalkyl)-π-allylcobalt tricarbonyl complex produced and the melting point of the isolated triphenylphosphine derivative thereof.

Table I

| Example | Diene | Organo Halide | 1-(α-Acylalkyl) π-Allylcobalt Tricarbonyl | Melting Point of the Triphenylphosphine Derivative |
|---|---|---|---|---|
| 1 | Butadiene | Methyl iodide | 1-(Acetylmethyl) | 87–91°C. (dec.). |
| 2 | Isoprene | ----do---- | 1-(Acetylmethyl)-2-Methyl. | 107.5–108.5°C. (dec.). |
| 3 | ----do---- | Ethyl iodide | 1-(Propionylmethyl) | 93–95°C. (dec.). |
| 4 | 2,3-Dimethyl-1,3-butadiene. | Methyl iodide | 1-(Acetylmethyl)-1,2-dimethyl. | 101–103°C. (dec.). |
| 5 | Cis-piperylene | ----do---- | 1-(α-Acetylethyl) | 106.5–107.5°C. (dec.). |
| 6 | Cyclopentadiene | ----do---- | 1,3-(Acetylehtylene) | None. |
| 7 | 2-Methyl-2, 4-pentadiene. | ----do---- | 1-(Acetylmethyl)-3,3-dimethyl. | 120°C. (dec.). |
| 8 | Methyl sorbate | ----do---- | 1-(α-Acetylethyl)-3-carbomethoxy. | 85°C. (dec.). |

The 1-(α-acylalkyl)-π-allylcobolt tricarbonyls are believed to have the structure set forth below where the three carbon atoms of the allyl group are in a plane above the cobalt atom. The allyl group appears to be more or less symmetrical and π-bonded to the cobalt. The allyl carbon atoms have been numbered as shown to aid in naming these compounds.

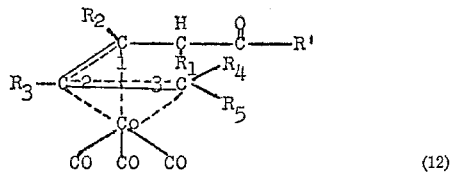

Instead of preparing the π-allylcobalt tricarbonyl complexes from a preformed acylcobalt carbonyl and a diene, it is possible to react a dienoyl chloride, e.g. 2,4-pentadienoyl chloride, 2,4-hexadienoyl chloride (sorbyl chloride), etc., with sodium cobalt carbonyl, whereby a dienoylcobalt carbonyl is produced which in turn, on warming to 25 to 100° C., undergoes an internal cyclization to give cyclopentenonylcobalt tricarbonyls according to the following reactions:

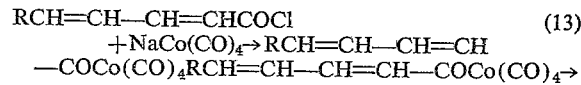

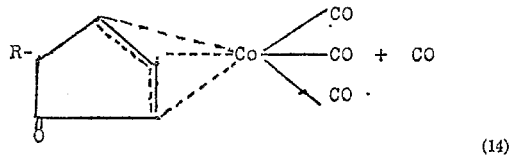

where R is hydrogen or alkyl. These cyclic complexes on treatment with a base yield cyclopentadienones. The following example demonstrates the preparation of a π-allyl-cobalt tricarbonyl complex by this process.

EXAMPLE 9

In a reaction vessel filled with carbon monoxide were placed 20 ml. of 0.1 M sodium cobalt carbonyl in tetrahydrofuran and 3.8 ml. of 1.1 M sorbyl chloride (2,4-hexadienoyl chloride) in tetrahydrofuran. The solution turned brown and gradually evolved about 3.1 millimoles fo carbon monoxide in 15 hours at room temperature. The infrared spectrum of this product indicated that the cyclic complex had been formed. To the reaction mixture was then added 3.0 ml. of 1.0 M triphenylphosphine in ether solution whereupon there was evolved 0.9 millimole of gas and the monotriphenylphosphine complex was formed. Evaporation of the solvent and several recrystallizations of the product from tetrahydrofuran-pentane gave orange crystals which decomposed at about 110° C. without melting. Analyses of the product were 66.15% carbon and 4.88% hydrogen, which were in agreement with the theoretical values of 66.11% and 4.70%, respectively, calculated for the cyclic π-complex methylcyclopentenonyl cobalt tricarbonyl $$(C_{26}H_{22}O_3PCo)$$

EXAMPLES 10–27

These examples illustrate the preparation of acyldienes from 1-(acylalkyl)-π-allylcobalt tricarbonyl complexes prepared by the general procedure described in Examples 1–8. Example 10 is typical of the preparation of the acyldienes.

Table II below are set forth the diene and organo halide used in preparing the π-allyl complex, the intermediate 1-(acylalkyl)-π-allylcobalt tricarbonyl produced, the base used, the temperature at which the reaction was carried out, the acyldiene obtained, the percent yield based on the carbon monoxide absorbed, and the melting point of the 2,4-dinitrophenylhydrazone formed from the acyldiene.

Table II

| Ex. | Diene | Organo Halide | 1-(α-Acylalkyl)-π-Allylcobalt Tricarbonyl Intermediate | Base | Temp., °C | Acyldiene Produced | Percent Yield | Melting Point of Hydrazone, °C |
|---|---|---|---|---|---|---|---|---|
| 10 | Butadiene | Methyl iodide | 1-(Acetylmethyl) | DCHEA [1] | 25 | 1,3-Hexadien-5-one | 100 | 183.5–4.0 |
| 11 | 2,3-Dimethyl butadiene | do | 1-(Acetylmethyl)-1,2-dimethyl | CH₃ONa [2] | 25 | 2,3-Dimethyl-1,3-hexadien-5-one | 87 | 160–1 |
| 12 | Isoprene | do | 1-(Acetylmethyl)-2-methyl | DCHEA | 25 | 2-Methyl-1,3-hexadien-5-one | 82 | 190 |
| 13 | Butadiene | CH₃OCH₂Cl | 1-(Methoxyacetyl-methyl) | DCHEA | 35 | 6-Methoxy-1-3-hexadien-5-one | 70 | 147 |
| 14 | do | ClCH₂—COOCH₃ | 1-(Carbomethoxy-methyl) | DCHEA | 45 | 6-Carbomethoxy-1,3-hexadien-5-one | 71 | 146–7 |
| 15 | do | Benzoyl bromide | 1-(Benzoylmethyl) | DCHEA | 25 | 5-Phenyl-1,3-pentadien-5-one | | [3] 130–148 |
| 16 | 1,3-Pentadiene (cis) | Methyl iodide | 1-(Acetylethyl) | DCHEA | 40 | 4-Methyl-1,3-hexadien-5-one | | 193–4 |
| 17 | Cyclopentadiene | do | 1,3-(Acetylethylene) | DCHEA | 40 | Acetylcyclopentadiene | 87 | 180–190 (dec.) |
| 18 | Butadiene | Ethyl iodide | 1-(Propionyl) | DCHEA | 25 | 1,3-Heptadien-5-one | 89 | 152–3.5 |
| 19 | 1,3-Pentadiene (trans) | Methyl iodide | 1-(Acetylmethyl)-3-methyl | DCHEA | 40 | 2,4-Heptadien-6-one | 74 | 207.5–8.0 |
| 20 | Cyclohexadiene | do | 1,3-(α-Acetyltri-methylene) | DCHEA | 25 | Acetylcyclohexadiene | 88 | 189–90 |
| 21 | Myrcene | do | 1-(Acetylmethyl)-2-(4-methyl-3-pentenyl) | DCHEA | 25 | Acetylmyrcene | 60 | 128–8.5 |
| 22 | Methyl sorbate | do | 1-(α-Acetylethyl)-3-carbomethoxy | DCHEA | 25 | Methyl Acetylsorbate | 42 | 218–19 |
| 23 | 4-Methyl-1,3-pentadiene | do | 1-(Acetylmethyl)-3,3-dimethyl | DCHEA | 40 | 2-Methyl-2,4-heptadien-6-one | 53 | 171–2 |
| 24 | Isoprene | Pivalyl chloride | 1-(Pivalylmethyl)-2-methyl | KO-tert.-C₄H₉ [4] | 25 | 2,6,6-Trimethyl-1,3-heptadien-5-one | | |
| 25 | Trans-1-methoxy-butadiene | Methyl iodide | 1-(Acetylmethyl)-3-Methoxy | DCHEA | 30 | 6-Methoxy-3,5-hexadien-2-one | 77 | |
| 26 | do | Ethyl bromoacetate | 1-(Carbethoxy-methyl)-3-methoxy | DCHEA | 50 | Ethyl-7-Methoxy-3-keto-4,6-heptadienoate | 75 | |
| 27 | do | Chloromethyl methyl ether | 1-(Methoxymethyl)-3-methoxy | DCHEA | 25 | 1,6-Dimethoxy-3,5-hexadien-2-one | | |

[1] DCHEA = Dicyclohexylethylamine.
[2] Added as a 1.0 M solution in methanol.
[3] Compound unstable and m. pt. varies with sample.
[4] Added as a 0.74 molar solution in tert.-butanol.

*Example 10.*—1-(acetylmethyl-π-allylcobalt tricarbonyl was prepared in ether solution as described above. The solvent was removed at 0° in vacuum and enough purified dioxane was added to the residue to make the solution 0.14 M in the complex. Fifteen milliliters of this solution was placed in a flask which was connected to a gas buret. The solution was stirred at 25° and 2.0 ml. of dicyclohexylethylamine was added. The solution gradually became nearly colorless and absorbed carbon monoxide. In 3 hours 2.21 mmoles were absorbed (theory 2.1 mmoles) and the reaction stopped. The infrared spectrum of the reaction mixture had a very strong band at 5.3μ (cobalt carbonyl anion) and a strong band at 5.99μ (1,3-hexadien-5-one).

Addition of excess 2,4-dinitrophenylhydrazine in ethanol solution containing sulfuric acid (prepared according to R. L. Shriner and R. C. Fuson, "The Systematic Identification of Organic Compounds," John Wiley & Sons, Inc., 1948, p. 171) to the reaction mixture resulted in the formation of a dark red, crystalline precipitate. The derivative was filtered off and recrystallized to give the pure 2,4-dinitrophenylhydrazone of 1,3-hexadien-5-one, M.P. 183.5–184.0°. Analysis found: C 52.23; H, 4.72 (uncorrected for the nitrogen present). Calculated for $C_{12}H_{12}O_4N_4$; C, 52.17; H, 4.38.

Examples 11–27 were carried out by the same general procedure except that in Examples 25–27, tetrahydrofuran was used as the diluent instead of dioxane. In

EXAMPLE 28

This example demonstrates the one-step preparation of acyldiene from diene and the use of cobalt octacarbonyl as a source of the cobalt hydrocarbonyl anion.

A solution of 3.6 g. $Co_2(CO)_8$, 15 ml. pure dicyclohexylethylamine, 5.21 g. of methyl chloride and 6.0 ml. of liquid butadiene in 30 ml. of absolute alcohol was placed in a carbon monoxide flushed pressure vessel. The solution was heated to 80° C. under 120–130 p.s.i. of carbon monoxide for 12 hours. More carbon monoxide was added as it was needed. The ultraviolet spectrum indicated the solution was 0.382 M in acetylbutadiene. Thus, 0.56 g. of acetylbutadiene was produced (about a 50% yield based upon the $Co_2(CO)_8$).

EXAMPLE 29

This example demonstrates the one-step preparation of acyldiene from diene and the use of a quaternary ammonium salt of cobalt hydrocarbonyl.

In a 1300 ml. pressure vessel were placed 12 g. of cobalt carbonate, 23.5 ml. of dicyclohexylethylamine and 100 ml. of absolute ethanol. The reaction was carried out at 160° C. under 4800 p.s.i. of a 1:1 mixture of carbon monoxide and hydrogen for 8 hours. The reaction mixture was cooled, the gases were vented off, and a solution of 126 ml. of dicyclohexylethylamine, 53 g. of methyl chloride, 60 ml. of liquid butadiene and 300 ml. of absolute ethanol was added. The reaction was carried out at 75° C. under 120–130 p.s.i. of carbon monoxide for 12 hours. Additional carbon monoxide was added as it was needed. The ultraviolet spectrum of the product showed the solution was 0.28 M in acetylbutadiene, i.e., about 18.1 g. of acetylbutadiene was produced.

EXAMPLE 30

This example illustrates the one-step preparation from a diene and a dialkyl sulfate.

With the temperature adjusted to 50° C. and under a pressure of one atm. of carbon monoxide, a reaction vessel connected to a source of carbon monoxide was charged with 20 ml. of 0.1 m. sodium cobalt carbonyl in tetrahydrofuran, 2.0 ml. of dicyclohexylamine, and 2.0 ml. of 1,3-cyclohexadiene. Then 0.4169 g. of diethyl sulfate was added. Carbon monoxide immediately began to be absorbed slowly. After reacting about 17 hours, 78 ml. of gas had been absorbed (56.5% of theory). The infrared spectrum showed a strong cobalt carbonyl anion band at $5.3\mu$ and a strong acyldiene band at $6.0\mu$. The 2,4-dinitrophenylhydrazone of the product was formed. It was dark red-brown, had a melting point of 196–7° C., and demonstrated that the product was 1-propionyl-1,3-cyclohexadiene.

EXAMPLE 31

A reaction vessel connected to a source of carbon monoxide, at room temperature (25° C.) and under one atm. of carbon monoxide, was charged with 20 ml. of 0.1 M sodium cobalt carbonyl in tetrahydrofuran and 2.0 ml. of 2,3-dimethyl-1,3-butadiene. Then 0.9 g. of methyl p-toluenesulfonate was added. Carbon monoxide was slowly absorbed. In 17 hours, 49 ml. (50% of theory) had been absorbed. To the reaction mixture was then added 8.0 ml. of 1.0 M sodium methoxide in methanol. After 30 minutes at 25° C., the preparation of the 2,3-dimethyl-1,3-hexadien-5-one from the $\pi$-allyl complex was complete.

EXAMPLE 32

A nitrogen-filled bottle at 0° C. was charged with 30 ml. of 0.07 M sodium cobalt carbonyl in ether solution, 5 ml. of butadiene and 3.0 ml. of 1.0 M crotyl bromide in ether solution. The reaction mixture was stirred at 0° C. for several hours and then held at that temperature for 16 hours. The infrared spectrum showed that the 1-acylmethyl-$\pi$-allyl complex had been formed. To convert this complex into an acyldiene, the solvent was evaporated at 0° C. under vacuum and the residue was dissolved in 20 ml. of tetrahydrofuran. This solution was placed in a flask filled with carbon dioxide and connected to a source of carbon dioxide. The solution was stirred at 25° C. and 2.0 ml. of dicyclohexylethylamine was added. Carbon dioxide was slowly absorbed. In four hours, 22 ml. had been absorbed (35% of theory based on the cobalt used). The infrared spectrum showed that the 1-crotonyl-1,3-butadiene, i.e. octa - 2,5,7 - triene - 4 - one, had been formed.

The following examples demonstrate the catalytic preparation of acylidenes wherein the cobalt hydrocarbonyl anion acts as a catalyst being regenerated and reused many times in each reaction.

EXAMPLE 33

In a stainless steel pressure vessel which had been flushed with carbon monoxide were put 30 ml. of 0.1 M sodium cobalt carbonyl in diglyme solution (diethylene glycol dimethyl ether), 10 ml. of dicyclohexylethylamine, 3.7 g. of butadiene, and 2.30 g. of methyl chloride. The vessel was pressured to 100 p.s.i. with carbon monoxide and heated to 70° C. with rocking for 10 hours. During this time sufficient carbon monoxide was added to keep the pressure at about 150 p.s.i. The reaction mixture was cooled and the ultraviolet spectrum of a portion of the product was taken. A 35% yield of 1,3-hexadiene-5-one was obtained based upon the methyl chloride used. This corresponds to about seven moles of acyldiene being produced per mole of sodium cobalt carbonyl used.

EXAMPLE 34

In a vessel which had been filled with carbon monoxide and closed off from the atmosphere by means of a rubber lined metal cap and containing a magnetic stirring bar, were placed by injection with a syringe through the rubber liner and a small hole in the metal cap 20 ml. of 0.2 M sodium cobalt carbonyl in tetrahydrofuran solution, 20 ml. of dicyclohexylethylamine, 22 ml. of butadiene and 5.0 ml. of methyl iodide. The solution was stirred and heated to 50° C. under 50 p.s.i. of carbon monoxide. When gas absorption stopped a sample of the solution was removed. The ultraviolet spectrum of the sample indicated a 56% yield of 1,3-hexadien-5-one was obtained based upon the methyl iodide used. Vacuum distillation of the reaction mixture led to the isolation of a 23% yield of the acyldiene, boiling point of 47–8° C. at 17 mm.

EXAMPLE 35

In a vessel as described in Example 34 were placed 20 ml. of 0.2 M sodium cobalt carbonyl in tetrahydrofuran, 10 ml. dicyclohexylethylamine, 10 ml. cis-piperylene and 2.0 ml. methyl iodide. The reaction mixture was heated to 70° C. under 50 p.s.i. of carbon monoxide for 15 hours. The infrared spectrum indicated about a 50% yield of the acyldiene (4-methyl-1,3-hexadien-5-one) was obtained. Distillation gave a 15% yield of the acyldiene, boiling point about 62–5° C. at 20 mm.

EXAMPLE 36

In a vessel as described in Example 34 were placed 30 ml. of 0.1 M sodium cobalt carbonyl in ethanol solution, 10 ml. of dicyclohexylethylamine, 7 ml. of isoprene and 2.0 ml. of methyl iodide. The reaction mixture was heated with stirring at 50° C., under 32 p.s.i. of carbon monoxide, until gas absorption stopped. The ultraviolet spectrum of the reaction mixture indicated that an 89% yield of 2-methyl-1,3-hexadien-5-one was obtained.

EXAMPLE 37

The reaction was carried out as in Example 36 except that 8.0 ml. of triethylamine was used instead of 10 ml. of dicyclohexylethylamine. A 20% yield of 2-methyl-1,3-hexadien-5-one was obtained.

EXAMPLE 38

2-hydroxycyclohexylcarbonylcobalt tetracarbonyl was prepared by the addition of cobalt hydrocarbonyl to cyclohexene oxide in the presence of carbon monoxide. In a reaction flask connected to a gas buret filled with carbon monoxide were placed 20 ml. of diethyl ether and 1.0 ml. of cyclohexene oxide. The solution was stirred at 0° C. and 3.0 ml. of 0.59 M cobalt hydrocarbonyl in pentane solution was added. The reaction took up 1.45 millimoles of carbon monoxide (82% of theory) in 30 minutes and the reaction stopped. Then 2.0 ml. of isoprene were added and the solution was left at 25° C. for 3.5 hours. The infrared spectrum indicated that 1-(2-hydroxycyclohexylcarbonylmethyl) - 2 - methyl - $\pi$ - allylcobalt tricarbonyl had been formed. The reaction mixture was then treated with 2.0 ml. of dicyclohexylethylamine. Carbon monoxide was slowly absorbed. After 15 hours the reaction was complete. The ultraviolet spectrum indicated about a 64% yield of 1-(2-hydroxycyclohexyl)-4-methyl-2,4-pentadien-1-one was obtained based upon the cobalt hydrocarbonyl used.

The following example demonstrates the preparation of saturated ketones from a 1-($\alpha$-acylalkyl)-$\pi$-cobalt tricarbonyl by the hydrogenation thereof.

EXAMPLE 39

A solution of the 1-acetylmethyl-$\pi$-allylcobalt tricarbonyl complex was prepared from 30 ml. of 0.07 M NaCo(CO)$_4$ in ether, 2 ml. butadiene and 0.5 ml. of methyl iodide. After standing an hour at 25° C., the solution was put in a hydrogen-flushed pressure vessel and shaken at 80° C. under 3000 p.s.i. of hydrogen for 24 hours. The reaction mixture contained a 40% yield of methyl n-butyl ketone as determined by gas chromatography. Another product was also present in about the same amount which was believed to be a methyl butenyl ketone.

The 1-(α-acylalkyl)-π-allylcobalt tricarbonyl complexes of this invention can be prepared from any alkyl-, cycloalkyl-, aryl-, alkaryl-, alkenyl-, haloalkyl-, etc., or acylcobalt carbonyl and any conjugated diene which contains at least one hydrogen attached to one of the terminal carbons of the diene group. As previously pointed out, they are believed to have the structure shown in (12), where the three carbon atoms of the allyl group are in a plane above the cobalt atom. The allyl group appears to be more or less symmetrical with respect to the distance of the cobalt atom from the three carbons of the allyl group and is π-bonded to the cobalt.

The organo-cobalt carbonyls required for the preparation of these complexes can be obtained in a variety of ways. For example, alkylcobalt carbonyls can be prepared by the reaction of the cobalt carbonyl anion with an organic halide which can be a monohalogen or dihalogen substituted organic compound containing at least one aliphatic or cycloaliphatic radical in which the halogen is attached to a primary or secondary carbon atom. Thus, the cobalt hydrocarbonyl anion can be reacted with any alkyl-, alkenyl-, cycloalkyl-, cycloalkenyl-, aralkyl-, haloalkyl-, halocycloalkyl-, haloaralkyl-, alkoxyalkyl-, alkoxyaralkyl-, etc., halides; haloester, salt of a haloacid, etc. Exemplary of suitable organic halides that may be used for the reaction with the cobalt hydrocarbonyl anion to form the organocobalt carbonyls are as follows: methyl chloride, methylene chloride, methyl iodide, ethyl chloride, ethyl bromide, propyl chloride, butyl bromide, isobutyl chloride, pentyl iodide, hexyl chloride, cyclohexyl chloride, 2-iodooctane, 1,8-dibromooctane, oleyl chloride, stearyl bromide, chlorinated kerosene (keryl chloride), allyl chloride, allyl bromide, crotyl chloride, crotyl fluoride, methallyl chloride, cyclopentenyl chloride, 5-octenyl bromide, undecenyl chloride, tetrahydrofurfuryl chloride, benzyl chloride, benzyl fluoride, benzyl bromide, benzyl iodide, ortho-, meta-, and para-methoxy benzyl chlorides, α-monochloroxylene, α,α'-dichloroxylenes, α-chloromethylnaphthalene, cinnamyl chloride, chloromethyl methyl ether, β-chloroethyl ethyl ether, β,β'-dichlorodiethyl ether, chloromethyl isobutyl ether, β-bromoethyl vinyl ether, α-chloropropyl propyl ether, methyl chloroacetate, ethyl bromoacetate, methyl 3-chloropropionate, ethyl α-bromopropionate, methyl p-chloromethyl benzoate, sodium chloroacetate, sodium chloropropionate, chloroacetonitrile, 3-chloropropionitrile, 3-chloropropyl methyl ketone, etc.

The alkylcobalt carbonyls can also be prepared by the reaction of the cobalt hydrocarbonyl anion with an alkyl sulfonate, or a dialkyl sulfate. Typical of these compounds that may be reacted with the cobalt carbonyl anion are as follows: esters of methane sulfonic acid, ethane sulfonic acid, ethylene sulfonic acid, etc., ethyl benzenesulfonate, methyl p-toluenesulfonate, isooctyl methanesulfonate, dimethyl sulfate, diethyl sulfate, dipropyl sulfate, dioctyl sulfate, didecyl sulfate, allyl methanesulfonate, diallyl sulfate, dibenzyl sulfate, 3-phenylpropyl p-toluenesulfonate, cyclopentyl benzenesulfonate, dicyclohexyl sulfate, etc.

Alkylcobalt carbonyls can also be prepared by the reaction of cobalt hydrocarbonyl with an olefin such as ethylene, propylene, cis-2-butene, isobutylene, 1-pentene, cyclopentene, cyclohexene, styrene, vinyl cyclohexene, butadiene, isoprene, etc., and substituted olefins such as methyl acrylate, methyl 3-butenoate, 4-chloro-1-butene, divinyl ether, vinyl acetate, etc. If carbon monoxide is present in this reaction, acylcobalt carbonyls are obtained. If, in the case of dienes, two moles of the diene are reacted with one mole of cobalt hydrocarbonyl, the acylalkyl-π- allylcobalt tricarbonyl is produced directly according to the following equations, using butadiene for illustrative purposes:

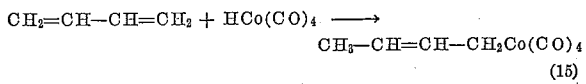

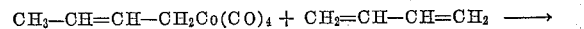

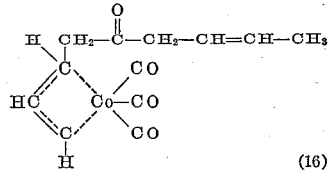

Another method for obtaining alkylcobalt carbonyls is by the reaction of epoxides with cobalt hydrocarbonyl, in which case β-hydroxyalkylcobalt carbonyls are obtained. If, instead of cobalt hydrocarbonyl, a salt of cobalt hydrocarbonyl is used, the reaction should be carried out in the presence of a hydrogen donor, such as water or alcohols, to produce the hydroxyalkylcobalt carbonyl since otherwise a metal salt of the hydroxyalkyl group is obtained. The preparation from an epoxide may be illustrated by the following equations:

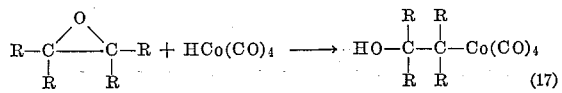

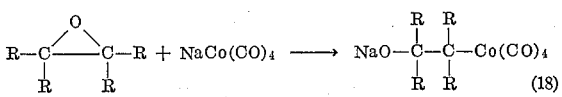

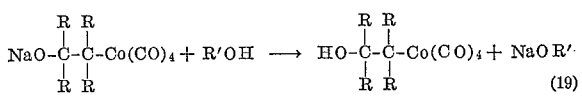

where R' is hydrogen or alkyl, etc. Exemplary of the epoxides which can be used are the vicinal epoxides such as ethylene oxide, propylene oxide, cis-2-butene oxide, trans-2-butene oxide, 1-butene oxide, isobutylene oxide, cyclopentene oxide, cyclohexene oxide, butadiene monoxide, butadiene dioxide, methyl glycidate, epichlorohydrin, styrene oxide, α-methylstyrene oxide, epoxyallyl alcohol, vinylcyclohexane oxide, vinylcyclohexene monoxide, vinylcyclohexene dioxide, epoxyoleic acid, epoxycholesterol, etc. In addition to the vicinal epoxides, other epoxides such as trimethylene oxide and substituted trimethylene oxides can be used. Exemplary of the latter are 1-methyltrimethylene oxide, 2-methyltrimethylene oxide, 1-chloromethyltrimethylene oxide, 2,2-bis(chloromethyl)trimethylene oxide, phenyltrimethylene oxide, dimethyltrimethylene oxide, etc.

Since acylcobalt carbonyls are equivalent to alkylcobalt carbonyls in this invention [see Equations 1 and 9], any acylcobalt carbonyl can also be used. Acylcobalt carbonyls can be prepared from any alkylcobalt carbonyl, prepared as described above, and carbon monoxide [see Equation 8]. Acylcobalt carbonyls can also be prepared by reaction of any acyl halide and the cobalt hydrocarbonyl anion. In fact, in many cases the alkylcobalt carbonyls are prepared only with difficulty or in low yields because of the unreactivity of the organic halide used to prepare the alkylcobalt carbonyl, as for example, the aromatic halides such as bromobenzene, p-bromotoluene, α-bromonaphthalene, p-bromoanisole, etc., and the vinyl halides. However, the acylcobalt carbonyls are readily prepared from the corresponding acyl halides, e.g. benzoyl chloride, p-toluoyl chloride, α-naphthoyl chloride, p-anisoyl chloride, etc., or acylyl chloride, crotonoyl chloride, etc. In the same way, in the case of very reactive halides such as the tertiary halides or β-phenethyl halides which undergo elimination very easily, the corresponding acyl halides are better used. Exemplary of the acyl halides which can be used in this reaction are as follows: acetyl chloride, acetyl bromide, propionyl chloride, isobutyroyl bromide, n-hexanoyl chloride, 10-undecenoyl chloride, allylacetyl chloride, 2,4-pentadienoyl chloride, 2,4-hexadienoyl chloride (sorbyl chloride), benzoyl chloride, benzoyl bromide, α-naphthylacetyl chloride, p-chlorobenzoyl chloride, cyclohexylacetyl chloride, cyclopentenylcarbonyl chloride, monomethyl succinoyl chloride, 2-cyanopropionyl chloride, terphthaloyl chloride, adipoyl chloride, 5-chloropentanoyl chloride, trimethylacetyl chloride, trifluoromethylacetyl chloride, etc.

As has already been pointed out and demonstrated by the examples, any source of cobalt hydrocarbonyl anion may be used in preparing the organocobalt carbonyls used in the reactions of this invention. Thus, cobalt hydrocarbonyl or any metal salt of cobalt hydrocarbonyl may be used as, for example, the alkali metal and alkaline earth metal salts, or ammonium or quaternary ammonium salts can be used. Another useful source of this anion is cobalt octacarbonyl. In the latter case the reaction is preferably carried out in the presence of a polar organic compound or solvent for best results.

Any conjugated diene can be used for the preparation of the 1-(α-acylalkyl)-π-allylcobalt tricarbonyl complexes of this invention, provided that there is at least one hydrogen attached to a terminal carbon of the diene group, i.e. any diene containing the following group:

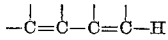

the other open valences being attached to hydrogen, halogen, oxygen, carbon, etc. Thus, any diene having the general formula:

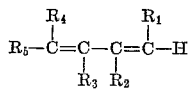

where $R_1$, $R_2$, $R_3$, $R_4$, and $R_5$ can each be hydrogen, alkyl, cycloalkyl, aryl, aralkyl, alkoxy, halo, carboalkoxyalkyl, alkenyl, or cycloalkenyl and may be alike or different, or two of them together may form an alicyclic ring. Exemplary of the dienes which can be used are butadiene, isoprene, 2,3-dimethyl-1,3-butadiene, 1,3-pentadiene (cis- or trans-piperylene), 2-methyl-2,4-pentadiene, trimethylbutadiene, 1-chlorobutadiene, 2-chlorobutadiene (chloroprene), myrcene, allo-ocimene, allyl butadiene, cyclopentadiene, 1,3-cyclohexadiene, 1-vinylcyclohexene, bicyclohexenyl, cholestadiene, cyclohexylbutadiene, 1-phenylbutadiene, 2-phenylbutadiene, diphenylbutadiene, hexatriene, dimethylhexatriene, cyclohexenylbutadiene, 2-vinylbutadiene, and similar higher conjugated polyenes and other compounds containing the conjugated diene group such as methyl sorbate, 1-methoxybutadiene, etc.

The reaction of the organocobalt carbonyl and the diene can be carried out in any inert, liquid diluent as, for example, ethers, alcohols, ketones, esters, hydrocarbons, etc. If the sodium or other salts of cobalt hydrocarbonyl are used to prepare the alkyl- or acylcobalt carbonyl for the reaction, then a diluent which dissolves the salt is preferably used as, for example, ethers, ketones, esters, or alcohols, in which case the unstable alkyl- or acylcobalt carbonyls need not be isolated. Exemplary of the diluents which can be used are diethyl ether, dimethyl ether, diisopropyl ether, dibutyl ether, anisole, dioxane, tetrahydrofuran, ethylene glycol dimethyl ether, diethylene glycol dimethyl ether, methanol, ethanol, isopropanol, acetone, methyl ethyl ketone, cyclohexanone, ethyl acetate, dimethylformamide, dimethyl sulfoxide, acetonitrile, pentane, hexane, n-heptane, cyclohexane, benzene, toluene, etc.

The temperature at which the organocobalt carbonyl and diene are reacted can be varied over a wide range, depending upon the other reaction conditions. However, since the cobalt complexes generally become less stable as the temperature is raised, lower temperatures are usually preferred. Generally this reaction is carried out at a temperature of from about −20° C. to about 150° C., and preferably from about 0° C. to about 50° C. Any molar ratio of the two reactants may be used, but an excess of the diene is usually preferred. The reaction may be carried out at atmospheric or superatmospheric pressure. However, if the pressuring gas contains carbon monoxide, which tends to inhibit the reaction, the higher the pressure of carbon monoxide above about 2 or 3 atmospheres at 25° C., the slower the reaction may be. This effect is less as the temperature is raised.

The 1-acylalkyl-π-allylcobalt tricarbonyl complexes can be isolated by any convenient means. Thus, they may be isolated by distillation of the diluent at low temperatures, or in some cases, by distillation of the complex itself. Most of the complexes are oxidized by air and, hence, should be protected by an inert atmosphere. Another convenient method of isolating these complexes is to form their monotriphenylphosphine derivatives, which are usually higher melting and more stable than the tricarbonyl complex per se. These derivatives are easily prepared by adding triphenylphosphine to a solution of the tricarbonyl complex at a temperature of from about 0° C. to about 50° C. The phosphine derivative is then readily isolated by distillation of the solvent. Other phosphine derivatives may be obtained in a similar manner to isolate the tricarbonyl complexes.

The 1-(α-acylalkyl)-π-allylcobalt tricarbonyls and their phosphine derivatives are converted, in accordance with this invention, into acyldienes by reacting them with a base. The rate of the reaction depends upon the strength of the base; the stronger the base, the faster the reaction. However, since strong bases can also react with the acyldienes formed, causing various condensation and polymerization reactions to occur, it is preferable to use relatively mild bases, or small amounts of stronger bases, i.e. only the amount required to neutralize the cobalt hydrocarbonyl. Exemplary of the bases that may be used are sodium methoxide, potassium ethoxide, aluminum isopropoxide, potassium t-butoxide, calcium oxide, sodium hydroxide, magnesium oxide, triethylamine, tri-n-butylamine, N-ethylmorpholine, dicyclohexylamine, dicyclohexylethylamine, diethylaniline, N-ethylpiperidine, isopropyl di-n-butylamine. Alkoxides are very effective but preferably are used at temperatures below about 25° C. in order to prevent side reactions from occurring. Amines, on the other hand, can be used at higher temperatures, up to about 100° C. or higher, particularly if they are hindered amines. Hindered amines are preferred because they do not react with the product and do not complex with cobalt. The concentration of the base, if it is soluble, is not critical; but increasing the concentration increases the rate of reaction. Soluble bases are usually preferred, but insoluble ones can also be used. In order to obtain the best yields of acyldienes, at least one equivalent of the base should be used. The reaction may be carried out under atmospheric or superatmospheric pressure. It is convenient to carry out the reaction under carbon monoxide, but it is not necessary. Under carbon monoxide the cobalt tricarbonyl anion is converted into cobalt tetracarbonyl anion, see Equation 7, and the course of the reaction can be followed by observing the amount of carbon monoxide absorbed. When carbon monoxide absorption stops, the reaction is complete. The amount of gas absorbed is also usually a good indication of how much acyldiene was formed, since one mole of carbon monoxide should be absorbed per mole of acyldiene formed.

The acyldiene preparation may also be carried out catalytically with respect to the salt of cobalt hydrocarbonyl employed. In this case the alkyl- or acylcobalt carbonyls used must be prepared from a salt of cobalt hydrocarbonyl and any of the alkyl halides, acyl halides, sulfonates, sulfates or epoxides mentioned before. The salt of cobalt hydrocarbonyl, the halide, sulfonate, sulfate or epoxide, the base and the conjugated diene are all reacted together under a carbon monoxide atmosphere in an inert diluent such as those mentioned previously. High carbon monoxide pressure may inhibit the reaction, but at least a stoichiometric amount of carbon monoxide is required by the reaction. Higher pressures can be used at higher temperatures. The useful ranges are about 0.1 atmosphere to about 2 or 3 atmospheres of carbon monoxide at 0° to about 40–50 atmospheres or higher at 120°. If halides, sulfonates or sulfates are used in the catalytic reaction, enough base must be used so that all of the acidic hydrogen produced in the reaction will be neutralized. This will usually mean at least one equivalent of base should be used per mole of halide, sulfonate or sulfate which is to be reacted. Best results are usually obtained if the reaction mixture is homogeneous, but the reactions will go in heterogeneous systems also. The most preferred diluents for the catalytic reaction are ethanol, tetrahydrofuran, and diethylene glycol dimethyl ether.

This invention makes possible the preparation of a completely new group of organocobalt complexes and provides an excellent method for preparing a large variety of acyldienes which previously were either unknown or extremely difficult to obtain. The present method is also advantageous because the products are usually obtained in high yields and they are easily purified.

In addition to their use as intermediates in the preparation of acyldienes, the 1-($\alpha$-acylalkyl)-$\pi$-allylcobalt tricarbonyls are useful as intermediates in other chemical reactions. Thus, as demonstrated in the examples, they can be hydrogenated to prepare ketones and olefinic ketones. They can also be oxidized to prepare hydroxyketones. These complexes are also very soluble forms of cobalt and, hence, are useful as catalysts for oxidation, etc.

The acyldienes that are prepared in accordance with this invention also represent a useful class of chemical intermediates. Thus, they may be hydrogenated to saturated ketones and alcohols. They undergo the Diels-Alder reaction, and they polymerize and copolymerize readily. They can be cyclized to useful cyclic compounds, such as phenolic derivatives, substituted pyridines, etc. They are also useful in the synthesis of polyunsaturated compounds, such as vitamin A, etc.

It should be pointed out that the $\pi$-allylcobalt complexes and the acyldienes prepared therefrom may exist in more than one isomeric form. Thus, the geometry of the acylmethyl groups in the $\pi$-allylcobalt complexes may vary with respect to the cobalt atom. Referring to formula (12), the position of the

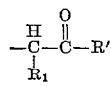

and the $R_2$ could be reversed. In many cases the complexes may be mixtures of these two isomers. When unsymmetrical dienes, containing a hydrogen attached to each of the terminal carbons of the diene group, are used, mixtures of the two possible acyldienes may be obtained, depending upon the hindrance of the groups attached to the diene group. In the same way, the substituted acyldienes that are prepared can often exist in various cis-trans forms. In some cases, the more stable, all trans-isomer is obtained, but in other cases mixtures of the cis and trans forms may be obtained.

What I claim and desire to protect by Letters Patent is:
1. The process of preparing a 1-($\alpha$-acylalkyl)-$\pi$-allyl-cobalt tricarbonyl which comprises reacting an acylcobalt carbonyl with a compound containing a conjugated diene group wherein at least one hydrogen is attached to a terminal carbon atom of said diene group, said compound having the formula

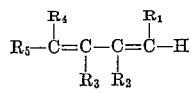

where each R is selected from the group consisting of hydrogen, alkyl, alkenyl, alkoxy, carboalkoxyalkyl, and two R's together form an alicyclic ring.

2. The process of claim 1 wherein the acylcobalt carbonyl is formed in situ by reacting a salt of cobalt hydrocarbonyl with an organic compound selected from the group consisting of alkyl halides, alkenyl halides, alkoxyalkyl halides, carboalkoxyalkyl halides, acyl halides, dialkyl sulfates, alkyl sulfonates and aralkyl sulfonates.

3. As a new composition of matter, 1-($\alpha$-acylalkyl)-$\pi$-allylcobalt tricarbonyl.

4. 1-(acetylmethyl)-$\pi$-allylcobalt tricarbonyl.

5. 1-(acetylmethyl)-2-methyl-$\pi$-allylcobalt tricarbonyl.

6. 1 - (methoxyacetylmethyl)-$\pi$-allylcobalt tricarbonyl.

7. 1 - (carbomethoxymethyl)-$\pi$-allylcobalt tricarbonyl.

8. The process of preparing a 1-($\alpha$-acylalkyl)-$\pi$-allylcobalt tricarbonyl which comprises reacting a salt of cobalt hydrocarbonyl, an alkyl halide, and a conjugated diolefin containing at least one hydrogen attached to a terminal carbon of the diene group.

9. The process of preparing a 1-($\alpha$-acylalkyl)-$\pi$-allylcobalt tricarbonyl which comprises reacting a salt of cobalt hydrocarbonyl, an alkyl halide, and a cyclohydrocarbon diene containing at least one hydrogen attached to a terminal carbon of the diene group.

10. The process of preparing a 1-($\alpha$-acylalkyl)-$\pi$-allylcobalt tricarbonyl which comprises reacting a salt of cobalt hydrocarbonyl, an alkoxyalkyl halide, and a conjugated diolefin containing at least one hydrogen attached to a terminal carbon of the diene group.

11. The process of preparing a 1-($\alpha$-acylalkyl)-$\pi$-allylcobalt tricarbonyl which comprises reacting a salt of cobalt hydrocarbonyl, a carboalkoxyalkyl halide, and a conjugated diolefin containing at least one hydrogen attached to a terminal carbon of the diene group.

12. The process of preparing a 1-($\alpha$-acylalkyl)-$\pi$-allylcobalt tricarbonyl which comprises reacting sodium cobalt tetracarbonyl, methyl iodide, and a conjugated diolefin containing at least one hydrogen attached to a terminal carbon of the diene group.

13. The process of preparing a 1-($\alpha$-acylalkyl)-$\pi$-allylcobalt tricarbonyl which comprises reacting sodium cobalt tetracarbonyl, chloromethyl methyl ether, and a conjugated diolefin containing at least one hydrogen attached to a terminal carbon of the diene group.

14. The process of preparing a 1-($\alpha$-acrylalkyl)-$\pi$-allylcobalt tricarbonyl which comprises reacting sodium cobalt tetracarbonyl, methyl chloroacetate, and a conjugated diolefin containing at least one hydrogen attached to a terminal carbon of the diene group.

References Cited in the file of this patent
UNITED STATES PATENTS

| | | |
|---|---|---|
| 2,570,713 | Richmond | Oct. 9, 1951 |
| 2,856,430 | Elam | Oct. 14, 1958 |
| 2,918,492 | Hathaway | Dec. 22, 1959 |
| 2,988,563 | Brantley | June 13, 1961 |
| 3,026,344 | Craven et al. | Mar. 20, 1962 |

UNITED STATES PATENT OFFICE
CERTIFICATE OF CORRECTION

Patent No. 3,137,715                  June 16, 1964

Richard F. Heck

It is hereby certified that error appears in the above numbered patent requiring correction and that the said Letters Patent should read as corrected below.

Column 1, line 61, for "cycolalkyl" read -- cycloalkyl --; column 2, line 63, after "follows:" insert the following formula:

columns 3 and 4, Table I, fourth column, line 8 thereof, for "1,3-(Acetylehtylene)" read -- 1,3-(Acetylethylene) --; column 4, line 65, for "fo" read -- of --; column 5, line 48, after "acetylmethyl" insert a closing parenthesis; column 7, line 54, for "-triene-" read -- -trien- --; column 10, line 71, for "acylyl" read -- acrylyl --; column 14, line 55, for "-(α-acrylalkyl)-" read -- -(α-acylalkyl)- --.

Signed and sealed this 3rd day of November 1964.

(SEAL)
Attest:

ERNEST W. SWIDER
Attesting Officer

EDWARD J. BRENNER
Commissioner of Patents